(12) United States Patent
Basir et al.

(10) Patent No.: US 7,370,883 B2
(45) Date of Patent: May 13, 2008

(54) THREE DIMENSIONAL OCCUPANT POSITION SENSOR

(75) Inventors: Otman Adam Basir, Kitchener (CA); Fakhreddine Karray, Waterloo (CA); Michael Kotlyachkov, Waterloos (CA); Vladimir Filippov, Kitchener (CA)

(73) Assignee: Intelligent Mechatronic Systems, Inc., Waterloo (CA)

( * ) Notice: Subject to any disclaimer, the term of this patent is extended or adjusted under 35 U.S.C. 154(b) by 898 days.

(21) Appl. No.: 10/161,021

(22) Filed: Jun. 3, 2002

(65) Prior Publication Data

US 2003/0222440 A1 Dec. 4, 2003

(51) Int. Cl.
*B60R 21/01* (2006.01)
*B60R 21/02* (2006.01)
*G06F 7/00* (2006.01)

(52) U.S. Cl. .......................................... 280/735; 701/45
(58) Field of Classification Search ................ 280/735; 701/45–47
See application file for complete search history.

(56) References Cited

U.S. PATENT DOCUMENTS

| 3,843,924 | A | | 10/1974 | Wahlgren |
| 4,305,074 | A | | 12/1981 | Barzana et al. |
| 4,796,013 | A | * | 1/1989 | Yasuda et al. ............... 340/562 |
| 5,118,134 | A | | 6/1992 | Mattes et al. |
| 5,214,388 | A | | 5/1993 | Vranish et al. |
| 5,247,261 | A | | 9/1993 | Gershenfeld |
| 5,247,281 | A | | 9/1993 | Facon et al. |
| 5,330,226 | A | | 7/1994 | Gentry et al. |
| 5,439,249 | A | | 8/1995 | Steffens, Jr. et al. |
| 5,482,314 | A | * | 1/1996 | Corrado et al. ............. 280/735 |
| 5,691,693 | A | | 11/1997 | Kithil |
| 5,770,997 | A | | 6/1998 | Kleinburg et al. |
| 5,772,686 | A | | 6/1998 | Caruana |
| 5,802,479 | A | | 9/1998 | Kithil et al. |
| 5,844,415 | A | | 12/1998 | Gershenfeld et al. |
| 5,871,232 | A | * | 2/1999 | White ........................ 280/735 |
| 5,890,085 | A | * | 3/1999 | Corrado et al. ................ 701/47 |

(Continued)

FOREIGN PATENT DOCUMENTS

DE 198 41 399 A 3/1999
DE 100 26 383 A 1/2001

OTHER PUBLICATIONS

J. R. Smith, "Field mice: Extracting hand geometry from electric field measurements", 1996, published in IBM Systems Journal, vol. 35, Nos. 3 & 4, pp. 587-608.*

(Continued)

*Primary Examiner*—Michael J. Carone
*Assistant Examiner*—Bret Hayes
(74) *Attorney, Agent, or Firm*—Carlson, Gaskey & Olds

(57) ABSTRACT

A roof-mounted sensor includes two rows of intersecting electrodes that are placed across an area of the vehicle's roof and a method to determine the position and motion of an occupant. This is accomplished by measuring physical values, which depend on the distance between the highest point of an occupant's body to each electrode in the row. Analysis of the physical values is used to derive an occupant's position relative to each row and the distance between the highest point of an occupant's body and the vehicle's roof. By analyzing the change in distances with respect to time, the occupant's motion can be tracked.

11 Claims, 3 Drawing Sheets

U.S. PATENT DOCUMENTS

| | | | |
|---|---|---|---|
| 5,948,031 A | 9/1999 | Jinno et al. | |
| 5,954,360 A | 9/1999 | Griggs, III et al. | |
| 6,007,095 A | 12/1999 | Stanley | |
| 6,020,812 A | 2/2000 | Thompson et al. | |
| 6,025,726 A | 2/2000 | Smith et al. | |
| 6,043,743 A | 3/2000 | Saito et al. | |
| 6,051,981 A * | 4/2000 | Gershenfeld et al. | 324/663 |
| 6,078,854 A * | 6/2000 | Breed et al. | 701/49 |
| 6,079,738 A | 6/2000 | Lotito et al. | |
| 6,088,640 A | 7/2000 | Breed | |
| 6,094,610 A | 7/2000 | Steffens, Jr. et al. | |
| 6,104,972 A | 8/2000 | Miyamoto et al. | |
| 6,234,520 B1 * | 5/2001 | Breed et al. | 280/735 |
| 6,302,438 B1 * | 10/2001 | Stopper et al. | 280/735 |
| 6,341,252 B1 * | 1/2002 | Foo et al. | 701/45 |
| 6,378,900 B1 * | 4/2002 | Stanley et al. | 280/735 |
| 6,439,333 B2 * | 8/2002 | Domens et al. | 180/268 |
| 6,442,465 B2 * | 8/2002 | Breed et al. | 701/45 |
| 2001/0003168 A1 | 6/2001 | Johnson et al. | |

OTHER PUBLICATIONS

PCT International Search Report, dated Aug. 20, 2003.

J.R. Smith: "Field mice: Extracting hand geometry from electric field measurements", IBM Systems Journal. vol. 35. No. 3&4, 1996, pp. 587-608.

* cited by examiner

THREE DIMENSIONAL OCCUPANT POSITION SENSOR

BACKGROUND OF THE INVENTION

The present invention relates to vehicle occupant safety systems, and more particularly, to a vehicle occupant proximity sensor for use with a vehicle occupant safety system.

Vehicle occupant safety systems that are activated in response to a vehicle crash for purpose of mitigating occupant injury are well known in the art. A vehicle may contain automatic safety restraint actuators such as front and side air bags, seat belt pretensioners, and deployable knee bolsters. The occupant protection system may further include a collision/crash sensor for sensing the occurrence of a vehicle crash and for providing an electrical signal indicative of the crash severity.

Several known occupant protection systems include an occupant position sensor that senses the position of the occupant with respect to an associated inflatable protection module. The occupant position sensor for such a system could be an ultrasonic sensor, an infrared sensor, and a capacitive sensor, and/or a weight sensor. A controller, which is connected to the sensors, controls the inflatable protection module in response to the sensed position of the occupant. In response to the sensed occupant position, one or more deployment aspects of the air bag may be adjusted. A protection system with adjustable aspects of deployment is commonly referred to as an "adaptive" protection system. Specifically, if the occupant is positioned in a position such that deploying the air bag will not enhance protection of the occupant, it may be desirable to suppress actuation of the occupant protection module. An occupant who is very near the protection module is referred to as being within an occupant out-of-position zone. Deploying the air bag for an occupant who is within the occupant out-of-position zone may not enhance protection of the occupant.

In any case the determination of occupant's position is an important part of adaptive occupant protection system. There are several types of proximity sensors, such as ultrasonic sensor, a video sensor, a capacitive sensor, and an infrared sensor. Different obstacles such as a map, a book, or a newspaper could occlude signals from ultrasonic and video sensors. A lighter or cigarette could blind an infrared sensor.

This invention is based on the conductivity of the human body. This phenomenon allows the occupant to be used as a transmitting antenna, determining his/her position within a defined space by measurement of electromagnetic values induced on a set of receivers.

SUMMARY OF THE INVENTION

The present invention provides an occupant position sensor utilizing an occupant's conductivity to determine the occupant's height and position by measuring the capacity between the occupant's head and a plurality of roof-mounted sensors (electrodes).

A transmitting electrode is mounted in a vehicle seat. An arrangement of receiving electrodes is mounted to the ceiling of the vehicle above the occupant's seat. The sensor utilizes the human body's conductivity by using the occupant as a transmitter. The highest point of an occupant's body is considered as source for the electromagnetic waveform. The values of the signals induced on each electrode is measured by the control unit and then processed in order to determine the position and to track the motion of the highest point of an occupant's body. The method presented in this invention provides the ability to determine a three-dimensional position of the highest point of an occupant's body within the sensing space.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF A PREFERRED EMBODIMENT

Figure 1:
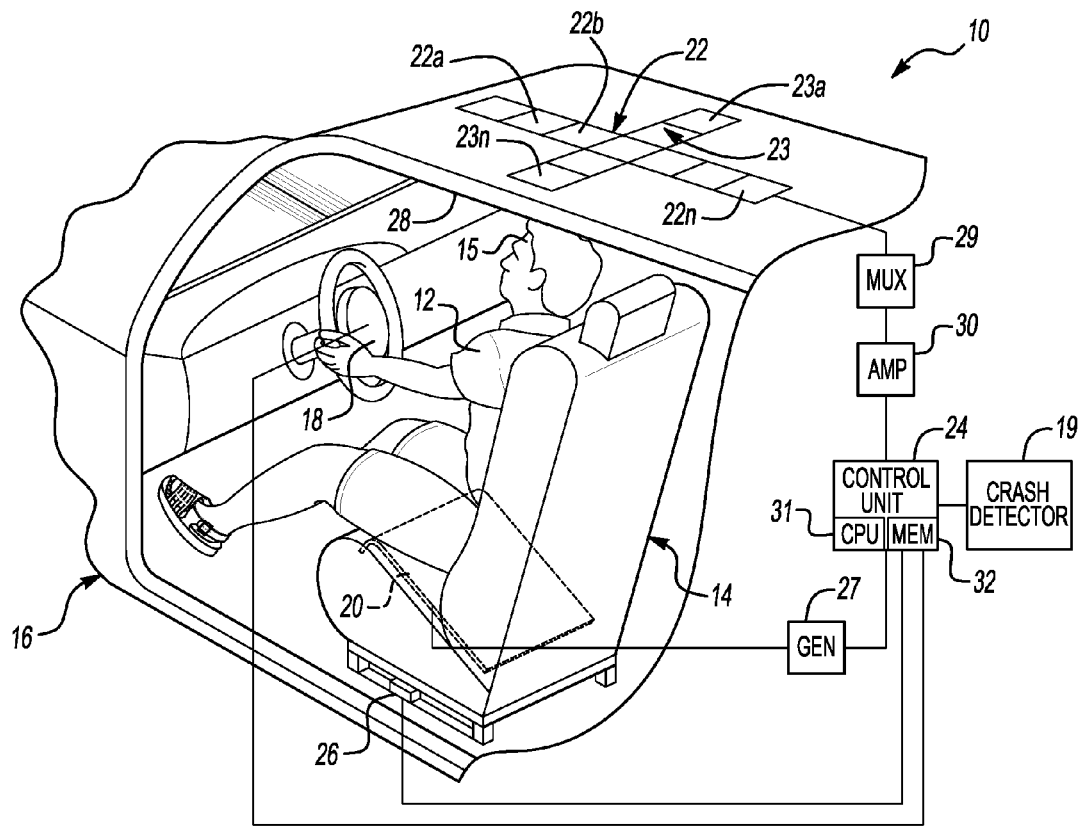
FIG. 1 illustrates the vehicle occupant proximity sensor installed in a vehicle passenger compartment with an occupant safety system.

FIG. 1 illustrates a vehicle occupant proximity sensor 10 for determining the height and position of an occupant 12 in a vehicle seat 14, and more particularly, for determining the three-dimensional position of the occupant's head 15. The occupant 12 and vehicle seat 14 are installed in a vehicle passenger compartment 16 having an occupant safety system, including an automatic safety restraint, such as an airbag 18. Although a steering wheel mounted airbag 18 is illustrated as an example, it should also be understood that the present invention is also useful for side airbags, seatbelt pre-tensioners, deployable knee bolsters, and any other automatic safety restraint actuators. Crash detector 19, such as a crash sensor of any known type, is used to determine the occurrence of a vehicle crash and to determine the crash severity.

The vehicle occupant proximity sensor 10 comprises a transmitting electrode 20 generating an electromagnetic signal and a first array 22 of receiving electrodes 22*a-n* perpendicularly intersecting a second array 23 of receiving electrodes 23*a-n*. The receiving electrodes 22*a-n*, 23*a-n* receive the electromagnetic signal generated by the transmitting electrode 20. A control unit 24 receives electrical signals from the receiving electrodes 22*a-n*, 23*a-n* based upon the electromagnetic signal received by the electrodes 22*a-n*, 23*a-n*. The control unit 24 may also receive a signal from seat track position sensor 26 indicating the position of the vehicle seat 14 on a vehicle track (not shown) in the passenger compartment 16.

The transmitting electrode 20 is mounted in the base of vehicle seat 14. The transmitting electrode 20 may comprise a coil of wire or a copper sheet and can be made from any conductive material, but preferably comprises a mesh of copper wires approximately one inch apart. Generally, it is preferred to cover a large area of the base of the seat 14 with the transmitting electrode 20 and to wrap the transmitting electrode around the front of the seat. It should be insured that the transmitting electrode is not shorted to ground via the frame of the vehicle. A frequency generator 27 generates a 10 KHz signal to the transmitting electrode 20, which is then transmitted as an electromagnetic signal in the passenger compartment 16.

The receiving electrode arrays 22, 23 are mounted in the vehicle headliner 28 in the passenger compartment 16 above the occupant 12. The receiving electrodes 22*a-n*, 23*a-n* each comprise a small conductive surface, preferably a 6.5 cm by 9 cm piece of printed circuit board. The receiving electrodes 22*a-n*, 23*a-n* are connected to the control unit 24 via a multiplexer 29 and amplifier 30. Again, it must be insured that none of the receiving electrodes 22*a-n*, 23*a-n* are shorted to ground via the frame. The multiplexer 29 enables the control unit 24 to sequentially read values from the receiving electrodes 22*a-n*, 23*a-n* to determine the three dimensional position of the occupant 12 according the method described below. Analog-to-digital converters (not shown) would convert the signals from amplifiers 30 to a computer-readable format.

The control unit 24 generally comprises a CPU 31 having memory 32, for example, RAM, ROM, DVD, CD, a hard drive, or other electronic, optical, magnetic, or any other computer readable medium onto which is stored programs for performing the steps and algorithms described herein. The CPU 31 is suitably programmed to perform the functions described herein and a person of ordinary skill in the art could program the CPU 31 accordingly and supply any additional hardware not shown but needed to implement the present invention based upon the description herein.

In operation, the control unit 24 controls generator 27 to generate a 10 KHz signal to the transmitting electrode 20. The transmitting electrode 20 transmits a 10 KHz signal as an electromagnetic wave inside the vehicle passenger compartment 16. The electromagnetic signal passes through occupant 12 and is received by the receiving electrodes 22*a-n*, 23*a-n*. The signal received by each receiving electrode is based upon the capacity between it and the transmitting electrode 20, which in turn will vary depending upon the proximity of the occupant 12 to each receiving electrode 22*a-n*, 23*a-n*. The size, spacing and number of electrodes in each of the receiving electrode arrays 22, 23 may vary for different applications and different vehicles.

The control unit 24 controls multiplexer 29 to sequentially read each of the receiving electrodes 22*a-n*, 23*a-n* in arrays 22, 23. Although performed sequentially, it is performed sufficiently quickly relative to normal motion of a vehicle occupant 12 to provide what is effectively an instantaneous snapshot of sufficient information to determine the height and position of the occupant 12 in the passenger compartment 16. The capacity at each receiving electrode 22*a-n*, 23*a-n* depends on the proximity of the occupant 12 to each receiving electrode 22*a-n*, 23*a-n*. Thus, the highest capacity will be measured at the receiving electrode closest to head 15 of the vehicle occupant 12.

The occupant is coupled to the oscillator via the seat-mounted electrode to provide a capacitive connection. The electromagnetic wave is transmitted from the highest point of the occupant and is induced on each electrode. The value of the signal on each electrode is a function of the distance between the highest point of the occupant and the electrode (see FIG. 2). Amplifiers 30 send these values to the control unit 24.

Figure 2:
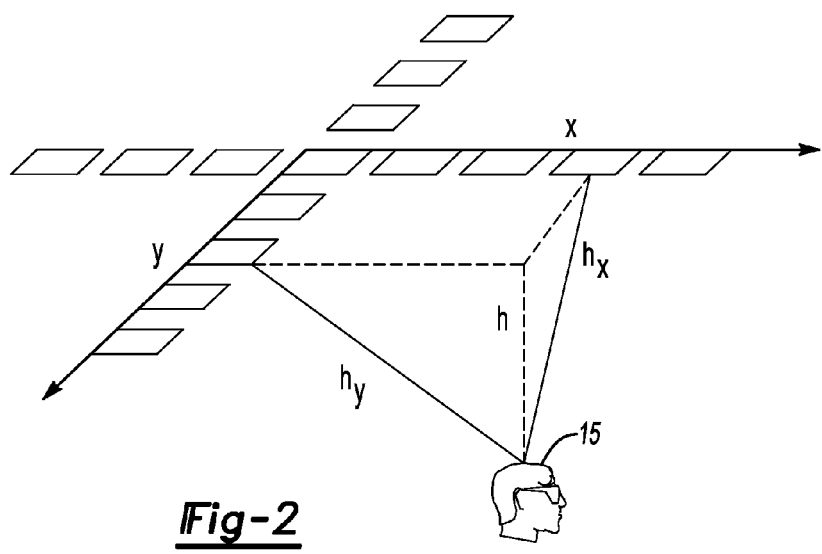
FIG. 2 is a schematic representation illustrating the calculation of the position and height of the occupant.

Referring to the simplified schematic shown in FIG. 2, the values of the signal on each electrode are processed independently for each row to obtain the x (or y) position coordinates along the row and the perpendicular distance $h_x$ (or $h_y$) to each row. The values are then used to calculate 3D coordinates according to equation:

$$h^2 = h_x^2 - y^2 = h_y^2 - x^2 \tag{1}$$

2D coordinates for each row are determined by using signal shape according to the following:

The electric field at the row is determined by measuring the electric field induced on the flat electrode. The linear size of the electrode and the typical object's size are significantly bigger than adequate accuracy. Therefore the determination of an absolute occupant position is solved using the calibration approach. During the calibration routine both the signal from a typical object, which is used as a calibration signal, and the absolute position of the object, are stored in memory 32. During operation, the position of a real object is determined as displacement of the object signal relative to the calibration signal.

The electric field of a complex object is a superposition of point sources of charge, so the presented system is a linear shift-invariant system for the given height. Convolution of a current signal with stored calibration signal is used to determine position along the row.

The position of the convolution's maximum corresponds to the value of shift of the current signal over the calibration signal. To avoid needs in calibration for each height, convolution with calibration signal for the medium height value is used. Convolution $K_n$ is calculated by Fourier transform according to convolution theorem is:

$$K_n = \sum_m S_m \cdot C_{n-m} = \Psi^{-1}[\Psi(S_n) \cdot \Psi(C_n)] \tag{2}$$

where $S_n$ is a signal sample's sequence, $C_n$—calibration signal sequence, $\Psi$ and $\Psi^{-1}$ is a pair of discrete Fourier transforms, defined as:

$$\Psi_n = \sum_{m=0}^{N-1} S_m \cdot l^{2\pi \cdot i \cdot m \cdot n / N} \quad \text{–forward transform} \tag{3}$$

$$S_n = \frac{1}{N} \cdot \sum_{m=0}^{N-1} \Psi_m \cdot l^{-2\pi \cdot i \cdot m \cdot n / N} \quad \text{–inverse transform}$$

The Fast Fourier Transform (FFT) algorithm is used to calculate the discrete Fourier transform.

For a more accurate determination of the convolution maximum position we use Fourier interpolation during the calculation of the inverse FFT, widening the frequency domain by padding it with zeros. According to linear system theory this gives us an accurate reconstruction of the continual sequence if the source sequence was sampled with an interval $\Delta = \frac{1}{2} f_c$, where $f_c$ is the Nyquist critical frequency. Also, the condition of non-overlapping frequency spectrums of the signal and the sampling function was kept. In this case the continual sequence S(x) is given by the formula:

$$S(x) = \Delta \sum_{n=-\infty}^{+\infty} S_n \cdot \frac{\sin[2\pi \cdot f_c(x - n \cdot \Delta)]}{\pi \cdot (x - n \cdot \Delta)} \quad (4)$$

Some weight functions such as Hamming or Kaiser windows are typically used to reduce an effect of spectrum overlap [2]. In our situation it seems it is impossible to use the weight method for 8 samples of source sequence. Instead we pad the source sequence with zeros up to 16 samples so that it becomes periodical with period 16. After the forward FFT we pad the frequency domain with zeros up to 64. Multiplying the sequence with $\Psi(C_n)$ and calculating inverse FFT we get 32 interpolation samples of convolution $K_n$ according to equations (2-4).

The system and method of the present invention also determine the height coordinate. Let's call a signal created by a point electric charge, a 'simple wave.' Point charge creates an electric field:

$$E = \frac{a \cdot q}{r^2} \quad (5)$$

where q is electric charge value, r—is the distance between charge and measurement point, and a—is a constant.

Figure 3:
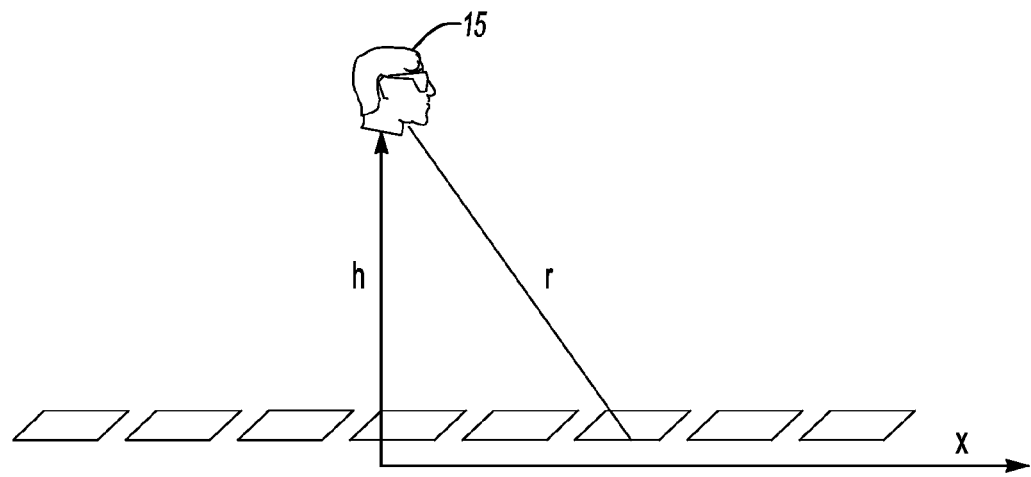
FIG. 3 is another schematic illustrating the method of calculating the position and height of the occupant.

Referring to FIG. 3, electric field is measured along a line placed on distance h from the charge so that the point nearest to the charge point is located at x=0.

Then the signal distribution along row will be:

$$S(x) = \frac{a \cdot q}{(h^2 - x^2)} \quad (6)$$

Signal at point x=0

$$S(0) = \frac{a \cdot q}{h^2} \quad (7)$$

Calculating quotient S(x)/S(0) results in the following:

$$\frac{S(x)}{S(0)} = \frac{h^2}{x^2 + h^2} \quad (8)$$

Or $$\frac{h^2}{x^2} = \frac{S(x)}{S(0) - S(x)} \quad (9)$$

From expression (9) the value of h can be evaluated. The accuracy of evaluation strongly depends on the definition of the x coordinate, the position of maximum and the level of signal noise. Increasing of the number of receptors can lead to a decreasing of receptor area and hence will decrease the signal/noise ratio. Thus we should restore signal between sample points using interpolation.

There are various methods for signal restoration, however these can differ by calculation complexity. According to the shape of our source function the best method may be a polynomial approximation. However to produce results with good accuracy this method may require complex calculation such as singular matrix decomposition. We suggest using Fourier analysis including Fourier interpolation of the signal between the sample points for a more accurate definition of the source coordinate.

Let us consider autocorrelation $K(x)=S(x) \oplus S(x)$ (the convolution $S(x)*S(x)$ is the same because of symmetric $S(x)$):

$$K(x) = \int_{-\infty}^{+\infty} S(y) \cdot S(x+y) \cdot dy = a \cdot q \cdot \int_{-\infty}^{+\infty} \frac{1}{h^2 + y^2} \cdot \frac{dy}{h^2 + (x+y)^2} \quad (10)$$

$$= \frac{x \cdot arctg\left(\frac{x+y}{h}\right) + x \cdot arctg\left(\frac{y}{h}\right) + h \cdot \ln\left(\frac{(x^2 + 2xy + y^2 + h^2)}{y^2 + h^2}\right)}{hx \cdot (x^2 + 4h^2)} \Bigg|_{-\infty}^{+\infty} =$$

$$= \frac{2 \cdot \pi}{(x^2 + 4 \cdot h^2) \cdot |h|}$$

Expression for the quotient K(x)/K(0)

$$\frac{K(x)}{K(0)} = \frac{2\pi/(x^2 + 4h^2) \cdot |h|}{2\pi/4h^2 \cdot |h|} = \frac{4h^2}{x^2 + 4h^2} = \frac{H^2}{x^2 + H^2} \quad (11)$$

which looks like (8) with H=2h.

Comparing (10) and (11) we obtain:

$$\frac{H^2}{x^2} = \frac{K(x)}{K(0) - K(x)} \quad (12)$$

So we conclude that h may be evaluated not only by using the signal, but also by the signal autocorrelation function. This function represents an integral characteristic of the signal and thus is less sensitive to noise. In addition this function is symmetric by its nature and has a maximum exactly at x equal to zero. Thus the problem of an accurate maximum position definition is not a present concern.

Experiments showed that expression (12) for h works very well. However, one weak dependence was found, h depends on the level of the hardware amplification, which differs for different K(x) parts. For better comprehension we will make the following analysis of K(x) shape.

Define inverse functions H(K) and x(K) so that argument k increases monotonically from 0 to K max=K(0), i.e.

$$0 \leq K \leq K\max \quad (13)$$

If H(K) and x(K) satisfy (12) we obtain:

$$\frac{H^2(K)}{x^2(K)} = \frac{K}{K\max - K} \quad (14)$$

Or $$H(K) = x(K) \cdot \sqrt{\frac{K}{K\max - K}} \quad (15)$$

H(K) should be a constant and therefore its derivative should be zero. Thus we obtain $$\frac{\partial H}{\partial K} = \frac{\partial x}{\partial K} \cdot \sqrt{\frac{K}{K\max - K}} + x(K) \cdot \frac{\partial}{\partial K}\left(\sqrt{\frac{K}{K\max - K}}\right) = \quad (16)$$

$$H(K) = \frac{\partial x}{\partial K} \cdot \sqrt{\frac{K}{K\max - K}} + x(K) \cdot \left(\frac{1}{2}\sqrt{\frac{K\max - K}{K}} \cdot \left(\frac{1}{K\max - K} + \frac{K}{(K\max - K)^2}\right)\right) =$$

$$= \frac{\partial x}{\partial K} \cdot \sqrt{\frac{K}{K\max - K}} + x(K) \cdot \frac{K\max}{(K\max - K)^{3/2} \cdot \sqrt{K}}$$

Substituing $\frac{\partial H}{\partial K} = 0$ we get from (16)

$$\frac{\partial x/\partial K}{x(K)} = -\frac{K\max}{2 \cdot K \cdot (K\max - K)} \quad (17)$$

For the explored signal we calculate the following functions:

$$f1(K) = \frac{\partial x(K)}{\partial K} \text{ and } f2 = -\frac{K\max}{2 \cdot K \cdot (K\max - K)} \cdot x(K) \quad (18)$$

The points where f1(K) and f2(K) intersect will be the best for determining h by using expressions (14-15) or (9). In an ideal situation f1(K) must be exactly the same as f2(K) but because of sampling, calculation, and deviation between the real signal form and the ideal $1/r^2$ function, f1(K) and f2(K) will not be the same. This can be improved by the presence of more than one crossover-point by using an average of h values calculated at these points.

We calculate autocorrelation function $K_n$ of source signal sequence $S_n$ by using FFT algorithm according to equations (2-3). $S_n$ is padded with zeros up 16 samples and a Fourier interpolation is used to get 32 samples of the autocorrelation function.

Figure 4:
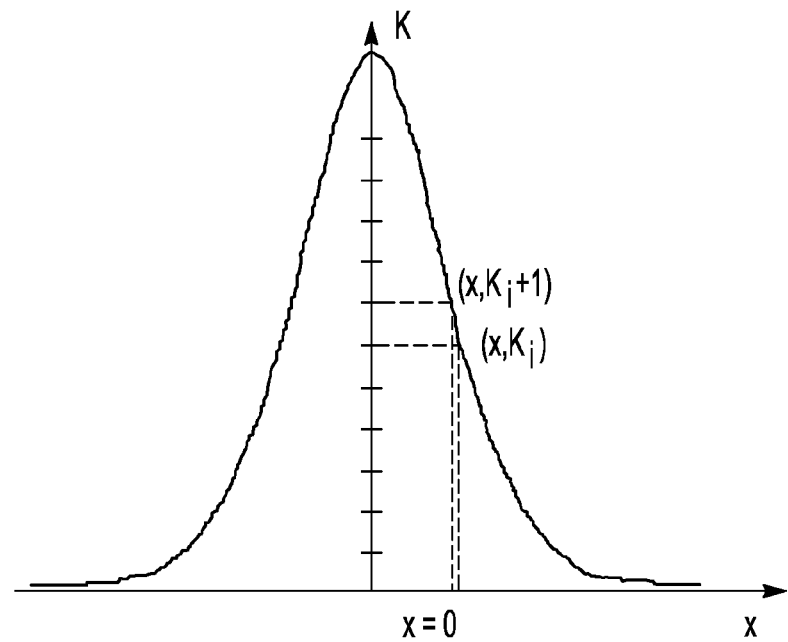
FIG. 4 is a graph illustrating the linear interpolation between neighboring samples of the autocorrelation function.

Discrete functions $f1(K_i)$ and $f2(K_i)$ are built (see FIG. 4) using linear interpolation between neighboring samples of $K_n$ $$f1(K_i) = \frac{x(K_{i+1}) - x(K_{i-1})}{2} \quad (20)$$

$$f2 = -\frac{K\max}{2 \cdot K_i \cdot (K\max - K_i)} \cdot x(K_i)$$

$$K_i = i \cdot \frac{K\max}{N}, i = 0, \ldots, N \text{ where } N = 32.$$

At the next step h is calculated at the points where $f1(K_i)-f2(K_i)\to 0$, using equation $$h \approx 2 \cdot x(K_i) \cdot \sqrt{\frac{K_i}{K\max - K_i}} \approx \quad (21)$$

$$f1(K_i) \cdot \frac{2 \cdot K_i^{3/2} \cdot \sqrt{K\max - K_i}}{K\max},$$

which is obtained from (15) and (17), when H=2·h.

Figure 5A:
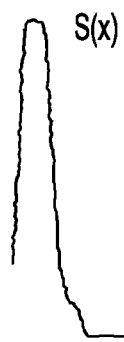
FIG. 5*a* is a graph of a source signal.
Figure 5B:
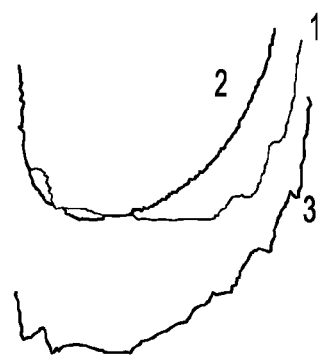
FIG. 5*b* shows graphs of functions $f1(K_i)$ (line 1), $f2(K_i)$ (line 2), $f1(K_i)-f2(K_i)$ (line 3) which were calculated for the source signal as illustrated in FIG. 5*a*.

FIG. 5b shows functions $f1(K_i)$ (line 1), $f2(K_i)$ (line 2), $f1(K_i)-f2(K_i)$ (line 3) which were calculated for a source signal as illustrated in FIG. 5a.

Figure 6A:
FIG. 6*a* is a graph of a source signal in an example when two objects create a resolution element in a signal.
Figure 6B:
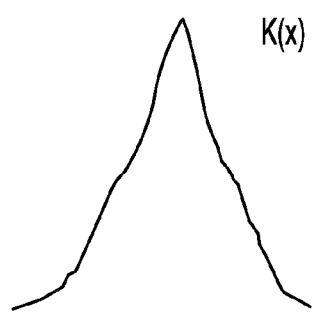
FIG. 6*b* is a graph of the autocorrelation function for the source signal of FIG. 6*b*.
Figure 6C:
FIG. 6*c* is a graph of f1(line 1), f2 (line 2) and f1−f2 (line 4) for the source signal for FIG. 6*a*.

FIG. 6 shows an example when two objects create a resolution element in a signal. FIG. 6a is a source signal, FIG. 6b is its autocorrelation function, FIG. 6c shows f1(line 1), f2(line 2) and f1-f2(line 4).

This algorithm involves one 16-point FFT, one 64-point FFT, one 32-point FFT and a few vector operations such as multiplication, subtraction and maximum search to determine 2D position for each row.

The control unit 24 monitors the information from the receiving electrode array 22 over time. For example, the position of the head 15 of occupant 12 cannot change instantaneously; it must follow a path from one point to another. The control unit 24 may additionally take information from the vehicle seat track sensor 26, which indicates the position of the vehicle seat 14 on a vehicle seat track.

All of this information is utilized by control unit 24 to determine whether to deploy the airbag 18 (or other safety restraint device) based upon a crash detected by crash detector 19 and the severity of a crash. For example, if the control unit 24 determines, based upon information from receiving electrode array 22, that the occupant 12 is too close to airbag 18, the control unit 24 may determine not to activate airbag 18 in the event of a crash, or the control unit 24 may determine that airbag 18 should be deployed with less force. On the other hand, if control unit 24 determines based upon information from receiving electrode arrays 22, 23 that occupant is at a distance from airbag 18 in excess of a predetermined threshold, the control unit 24 will cause airbag 18 to deploy, or will cause airbag 18 to deploy with higher force, depending upon the severity of the crash as determined by crash detector 19. The control unit 24 also determines the force with which the airbag 18 (or other sarety restraint device) should deploy based upon the height of the occupant 12.

Additionally, information from seat track sensor 26 may be utilized with the proximity information to determine whether and/or how airbag 18 should be deployed. For example, if seat track sensor 26 indicates that the vehicle seat 14 is adjusted forward in the vehicle passenger compartment 16, and the receiving electrode arrays 22, 23 indicate that the occupant 12 is also forward, the control unit 24 may determine not to deploy airbag 18 in the event of a crash. On the other hand, if the seat track position sensor indicates that the vehicle seat 14 is too far forward, the control unit 24 may decide not to deploy airbag 18, even though the receiving electrode arrays 22, 23 indicate that the head 15 of the occupant 12 is sufficiently rearward for deployment. This would occur in the event that the occupant 12 has the vehicle seat 14 reclined significantly. Further, the control unit 24 may determine that if the head 15 of the occupant 12 is sufficiently rearward, the airbag 18 may be deployed in the event of a crash even though the vehicle seat track position sensor 26 indicates that the vehicle seat 14 is too far forward. This would indicate that the occupant 12 again has the vehicle seat 14 reclined significantly and sufficiently that the airbag 18 should be deployed. Generally, those of ordinary skill in the art will program control unit 24 utilizing the above and many additional rules for whether to fire airbag 18, and for a multiple stage airbag 18, how much force airbag 18 should be deployed. The present invention provides additional information to the control unit 24, such that those of ordinary skill in the art could take in this additional information to properly determine whether and with how much force to activate airbag 18.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A method for determining a position of a vehicle occupant including the steps of:
   a. determining a two-dimensional position of an occupant, including the step of comparing relative strengths of signals received at a plurality of points to one another to determine the two-dimensional position of the occupant;
   b. after said step a., determining a position of the occupant in a third dimension; and
   c. after said step a., determining the three-dimensional position of the occupant based upon said steps a. and b.

2. The method of claim of claim 1 wherein said step a. includes the step of determining the two-dimensional position of the occupant in a plane generally parallel to a generally planar array of sensors.

3. The method of claim 1 wherein said step b. further includes the step of calculating the position of the occupant in the third dimension based upon a shape of the distribution of the strengths of the signals received at the plurality of points.

4. A method for determining a position of a vehicle occupant including the steps of:
   a. determining a two-dimensional position of an occupant, including the steps of determining a position of the occupant in a first dimension and then
   determining a position of the occupant in a second dimension, wherein the two dimensional position comprises the position in first dimension and the position in the second dimension;
   b. after said step a., determining a position of the occupant in a third dimension; and
   c. after said step a., determining the three-dimensional position of the occupant based upon said steps a. and b.

5. The method of claim 4 wherein the position of the occupant in the first dimension is determined in said step d. from a plurality of sensors arranged generally along the first dimension, and wherein the position of the occupant in the second dimension is determined in said step e. from a plurality of sensors arranged generally along the second dimension.

6. A method for determining a position of a vehicle occupant including the steps of:
   a) determining relative distances from each of a plurality of points to the occupant, the relative distances forming a signal distribution; and
   b) analyzing the signal distribution to determine a two-dimensional position of the occupant
   c) analyzing the signal distribution and the two-dimensional position to determine an absolute distance to the occupant.

7. The method of claim 6 wherein the signal distribution is formed in said step a) based upon capacitances measures at each of the plurality of points.

8. The method of claim 6 wherein the shape of the signal distribution is analyzed to determine the absolute distance to the occupant.

9. An occupant position-determining system comprising:
   a plurality of sensors measuring capacitance at a plurality of points near the occupant, the measured capacitances forming a signal distribution; and
   a control unit determining a position of the occupant based upon the signal distribution, wherein the control unit determines a two-dimensional position of the occupant based upon a comparison of capacitances measured at the plurality of points to one another, wherein the control unit determines an absolute distance from the plurality of points to the occupant based upon the signal distribution and based upon the two-dimensional position.

10. The position-determining system of claim 9 wherein the control unit determines an absolute distance from the plurality of points to the occupant based upon the signal distribution.

11. An occupant position-determining system comprising:
   a plurality of sensors measuring capacitance at a plurality of points near the occupant, the measured capacitances forming a signal distribution; and
   a control unit determining a position of the occupant based upon the signal distribution, wherein the control unit determines an absolute distance from the plurality of points to the occupant based upon the signal distribution, wherein the distance is calculated by:

$$\frac{h^2}{x^2} = \frac{S(x)}{S(0) - S(x)}$$

where h is the distance from the occupant to a plane containing the plurality of points, x is a distance in the plane from a closest one of the plurality of points to a second point of the plurality of points, S(x) is the signal at the second point, S(0) is the signal at the closest one of the plurality of points.

* * * * *

UNITED STATES PATENT AND TRADEMARK OFFICE
CERTIFICATE OF CORRECTION

PATENT NO. : 7,370,883 B2  Page 1 of 1
APPLICATION NO. : 10/161021
DATED : May 13, 2008
INVENTOR(S) : Basir et al.

It is certified that error appears in the above-identified patent and that said Letters Patent is hereby corrected as shown below:

ON THE TITLE PAGE:

Inventor Michael Kotlyachkov's information should read as: --Michael Kotlyachkov, Waterloo (CA)--

Signed and Sealed this

Nineteenth Day of August, 2008

JON W. DUDAS
*Director of the United States Patent and Trademark Office*